T. BARRETT & G. KNAPP.
Curtain Roller and Bracket.
No. 220,787. Patented Oct. 21, 1879.
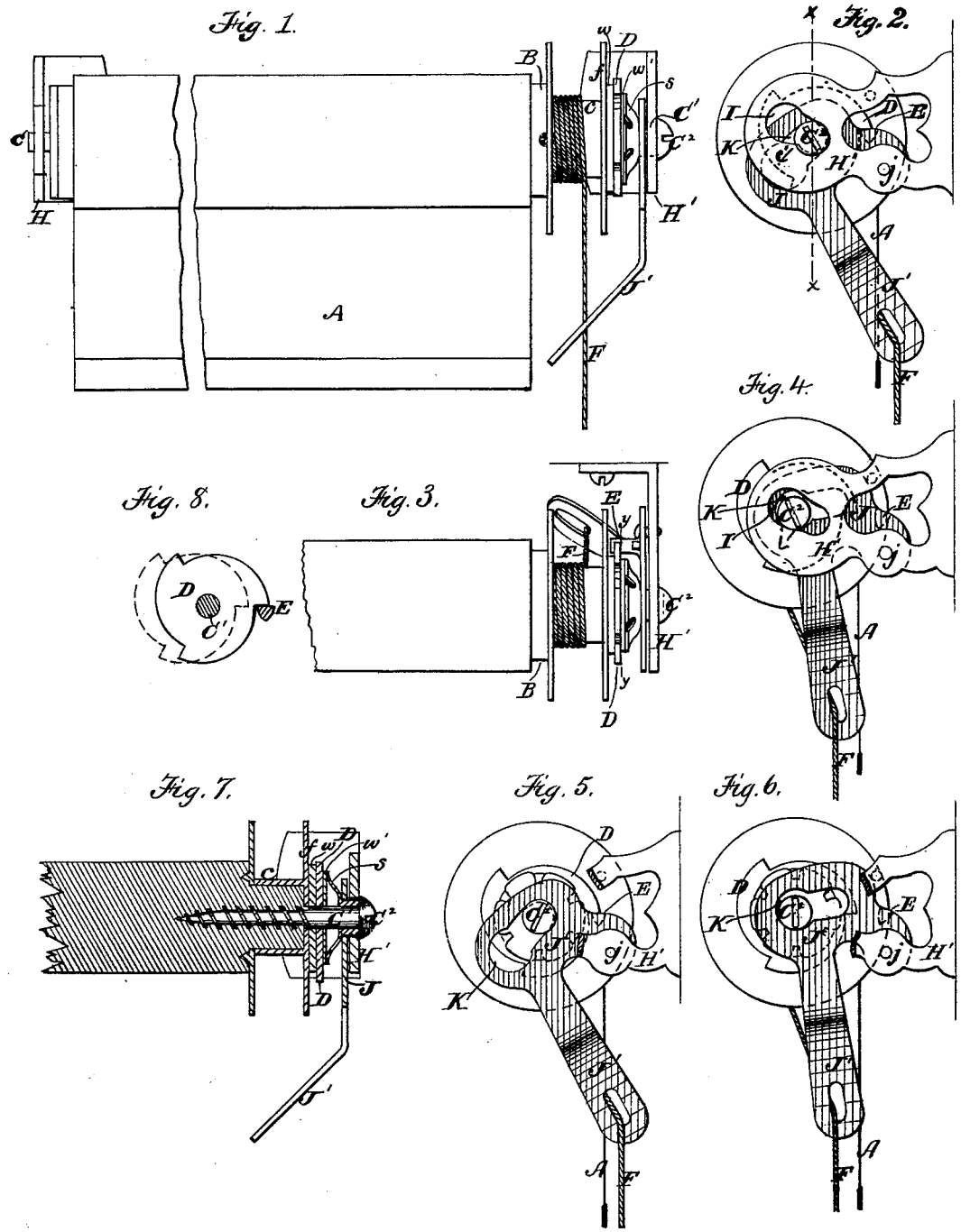

UNITED STATES PATENT OFFICE.

THOMAS BARRETT, OF BOSTON, AND GARDNER KNAPP, OF SOMERVILLE, ASSIGNORS TO AMERICAN SHADE ROLLER COMPANY, OF BOSTON, MASSACHUSETTS.

IMPROVEMENT IN CURTAIN-ROLLERS AND BRACKETS.

Specification forming part of Letters Patent No. 220,787, dated October 21, 1879; application filed June 25, 1879.

*To all whom it may concern:*

Be it known that we, THOMAS BARRETT, of Boston, in the county of Suffolk, and GARDNER KNAPP, of Somerville, in the county of Middlesex, both in the State of Massachusetts, have invented certain Improvements in Curtain-Fixtures, of which the following is a specification.

This invention relates to that class of curtain-fixtures in which the roller is rotated by a cord to raise the curtain, and is locked to support the curtain by a ratchet rotating with the roller and a dog pivoted to a fixed support, the dog being disengaged from the ratchet by a pull on the roller-cord to allow the curtain to fall by its own weight, and automatically engaged with the ratchet when the cord is released to stop the curtain.

The present invention has for its object mainly to facilitate the automatic engagement of the dog with the ratchet and insure the quick stoppage of the curtain when its cord is released, and also to improve the construction of the fixture in certain minor details.

To these ends our invention consists in the provision of means whereby the ratchet and its dog are moved simultaneously away from each other when the curtain-cord is pulled, and toward each other when said cord is released.

The invention also consists in the means provided for preventing in part the movement of the ratchet and dog toward each other while the curtain is being lowered, all of which we will now proceed to describe and claim.

Of the accompanying drawings, forming a part of this specification, Figure 1 represents a front elevation of a curtain roller and fixtures embodying our invention. Fig. 2 represents an end view, showing the ratchet engaged with the dog. Fig. 3 represents a top view. Fig. 4 represents an end view, showing the ratchet disengaged from the dog. Figs. 5 and 6 represent, respectively, end views, with the parts in the positions shown in Figs. 2 and 4, a portion of the bracket being broken away. Fig. 7 represents a section on line $x$ $x$, Fig. 2; and Fig. 8 represents a section on line $y$ $y$, Fig. 3.

Similar letters of reference indicate like parts in all the drawings.

In the drawings, A represents the curtain, B the roller, C C' the journals of the roller, D the ratchet, F the roller-cord, and E the dog, which is pivoted at $j$ to the bracket, hereinafter described, or to any suitable fixed support. H H' represent the brackets, in which are the bearings of the journals. The bracket H is of ordinary construction; but the bracket H', to which the dog E is pivoted, has an elongated bearing or slot, I, which is inclined upwardly from its inner to its outer end, as shown, and is preferably enlarged somewhat at its outer end. The journal C' of the roller passes through said slot and is adapted to be moved laterally therein. Said journal is provided with a head, $C^2$, which is somewhat larger than the narrower portion of the slot I, but is adapted to pass through the larger end.

J represents a plate, which is rigidly attached to and moves with the dog E, and is parallel with the inner side of the bracket H'. This plate and the dog E are in a single piece, the dog being a projection formed on one side of said plate.

K represents an elongated slot formed in the plate J. The journal C' passes through said slot K, which coincides with the slot I at different points, as shown in Figs. 2 and 4, and is preferably pear-shaped or enlarged at its outer end, as shown, and adapted to permit the passage of the head of the journal only through its larger end, its inner end, as well as the inner end of the slot I, being of sufficient size to receive the journal itself.

It will be seen that when the roller is allowed to assume its normal position its journal C' will rest in the lower and inner end of the inclined slot I. The plate J, its slot K, and dog E are so arranged that when the roller is in this position the journal C' is in the inner and smaller end of the slot K, the dog E is engaged with a tooth of the ratchet, as shown in Fig. 8, the slot K is inclined downwardly, as shown in Figs. 2 and 5, and the two slots K I together nearly surround the journal C' back of its head, as shown in Fig. 2, so that said journal cannot be moved longitudinally to withdraw it from the bracket H', its head being larger than the portions of the slots in which the journal rests. Now, by turning the plate J upwardly on its pivot, the lower edge of the slot K bearing against the journal C' raises the latter and moves it toward the upper and outer end of the slot I, as shown in Figs. 4 and 6, so that the enlarged ends of the slots I K coincide, and the head of the journal C may be passed through said enlarged ends in removing the roller from its supports. This upward and outward movement of the roller causes the weight of the end of the roller and curtain to be partly supported by said plate, and also moves the ratchet D and the dog E simultaneously from each other and separates them, as shown in dotted lines in Figs. 6 and 8, so that the roller is released and is free to rotate so long as the plate J is held in the position last described. When said plate is released, however, the weight of the roller and curtain exerted upon it forces it sharply and positively downward to its former position, thus moving the ratchet and dog simultaneously together and instantaneously locking the roller.

Any suitable means may be provided for producing the upward movement of the plate J. We prefer to employ an arm, J', projecting downwardly from the plate, slotted at its lower end for the passage of the roller-cord F, and arranged to deflect the cord backwardly from the center of the roller, as shown in Figs. 2, 4, 5, and 6.

The slot or bearing I in the bracket H' has a slight angle or upward projection, $i$, which is formed to retard or partially prevent the downward movement of the journal C' on said bearing. Said projection is not adapted to wholly stop the journal in its downward movement, but forms an obstruction, which, in connection with the tension or strain exerted on the curtain-cord by the operator, holds the journal C' at the upper portion of the slot or bearing while the curtain is being lowered, and prevents the roller from moving inwardly until the cord is released by the operator.

The bracket H', with its inclined slot or bearing, and the dog E, with its slotted plate, constitute a supporting, locking, and releasing device for the roller which is at once simple and cheap in construction and positive and effective in operation.

We are aware that it is not new to employ a ratcheted curtain-roller which is laterally movable, so that its ratchet can be moved by the curtain-cord from and by gravitation toward the dog that holds said ratchet. So far as we are aware, however, the movable roller has always been used heretofore with an immovable dog; hence the locking of the ratchet cannot be so rapid as in our improved fixture, in which the ratchet and dog move simultaneously. Unless the locking of the roller when the cord is released is extremely rapid there is danger that the curtain will gain such momentum in descending that the fixture or curtain, or both, will be injured by the shock attending the locking of the ratchet. This danger we entirely obviate.

We construct the ratchet D in an independent flat piece and place it loosely upon the journal of the roller, so that the latter can rotate independently of the ratchet. Between the ratchet and the end of the roller (or the flange $f$ of the cord-spool $e$, which is practically the end of the roller) is interposed a washer, $w$, of leather or other yielding material, and against the opposite side of the ratchet is placed a similar washer, $w'$.

$s$ represents a spring, of any suitable construction, which is secured to the journal C' and bears against the washer $w'$, pressing the latter against the ratchet and the ratchet against the washer $w$. By this means a frictional contact is maintained between the roller and the ratchet which is sufficient to prevent the weight of the curtain from rotating the roller, yet allows the roller to be rotated by the application of force to the curtain; hence the curtain can be pulled down without disengaging the dog and ratchet.

The yielding washers $w$ $w'$, being in contact with the opposite sides of the ratchet, make the independent rotation of the roller noiseless, and prevent excessive wear of the rubbing parts.

We are aware that a ratchet has been connected to a curtain-roller by friction to enable the curtain to be drawn down while the ratchet is locked.

We claim as our invention—

1. In combination with a ratcheted curtain-roller, a bracket having an inclined elongated slot or bearing to support one of the journals of the roller and permit the lateral movement of the ratcheted end of the roller, a pivoted dog or projection to engage with the ratchet of the roller, and means, substantially as described, whereby the ratchet and dog are moved simultaneously from each other when the cord of the roller is pulled, and toward each other to effect the rapid automatic locking of the roller when said cord is released, as set forth.

2. As a means for supporting, unlocking, and locking a ratcheted curtain-roller, the combination of a bracket, H', having an inclined slot or bearing, I, a pivoted dog, E, a plate, J, rigidly attached to said dog, and provided with a slot, K, arranged to coincide at different times with different portions of the slot or bearing I, and an arm attached to said plate, adapted to receive the curtain-cord and be moved by the latter, as set forth.

3. In a curtain-fixture in which the roller has a lateral movement, as described, the bracket H', having the inclined slot or bearing I, which has an obstruction, $i$, adapted to retard the downward movement of the journal of a curtain-roller, combined with the pivoted slotted plate J, adapted to move said journal to the upper end of the slot or bearing I, as set forth.

4. A curtain-roller bracket combined with a pivoted plate, said parts being provided with slots enlarged at their outer ends and adapted to coincide with each other at different points, whereby the longitudinal movement of a headed journal passing through said slots may be either prevented or allowed, as set forth.

5. In combination with a roller having a headed journal, C', the fixed bracket H' and pivoted plate J, provided, respectively, with slots enlarged at their outer ends and adapted to coincide with each other at different points, whereby the longitudinal movement of said headed journal and its roller may be either prevented or allowed, as set forth.

In testimony whereof we have signed our names to this specification in the presence of two subscribing witnesses.

THOMAS BARRETT.
GARDNER KNAPP.

Witnesses:
C. F. BROWN,
GEO. W. PIERCE.